Jan. 1, 1924 1,479,546
J. T. JOHNSON
COMBINATION FAUCET
Filed Jan. 4, 1922 2 Sheets-Sheet 2
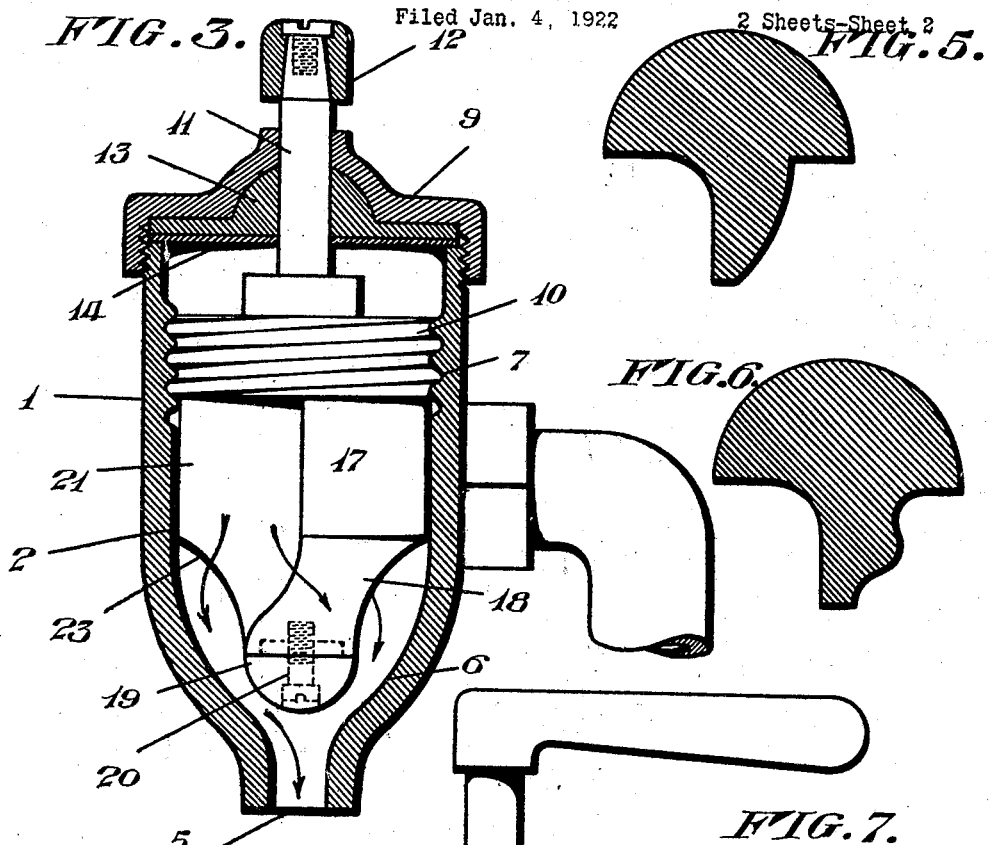
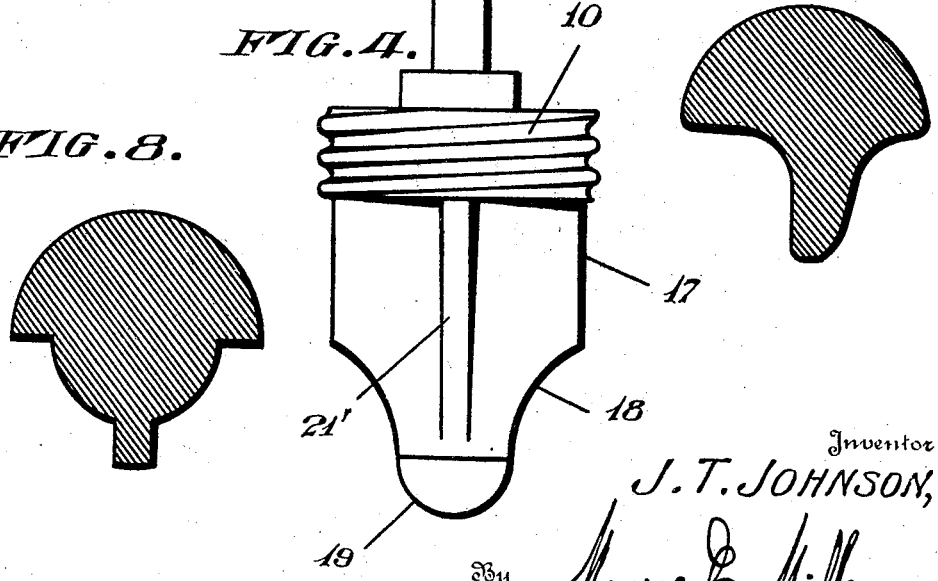
Inventor:
J. T. JOHNSON,
By Monroe E. Miller
Attorney.

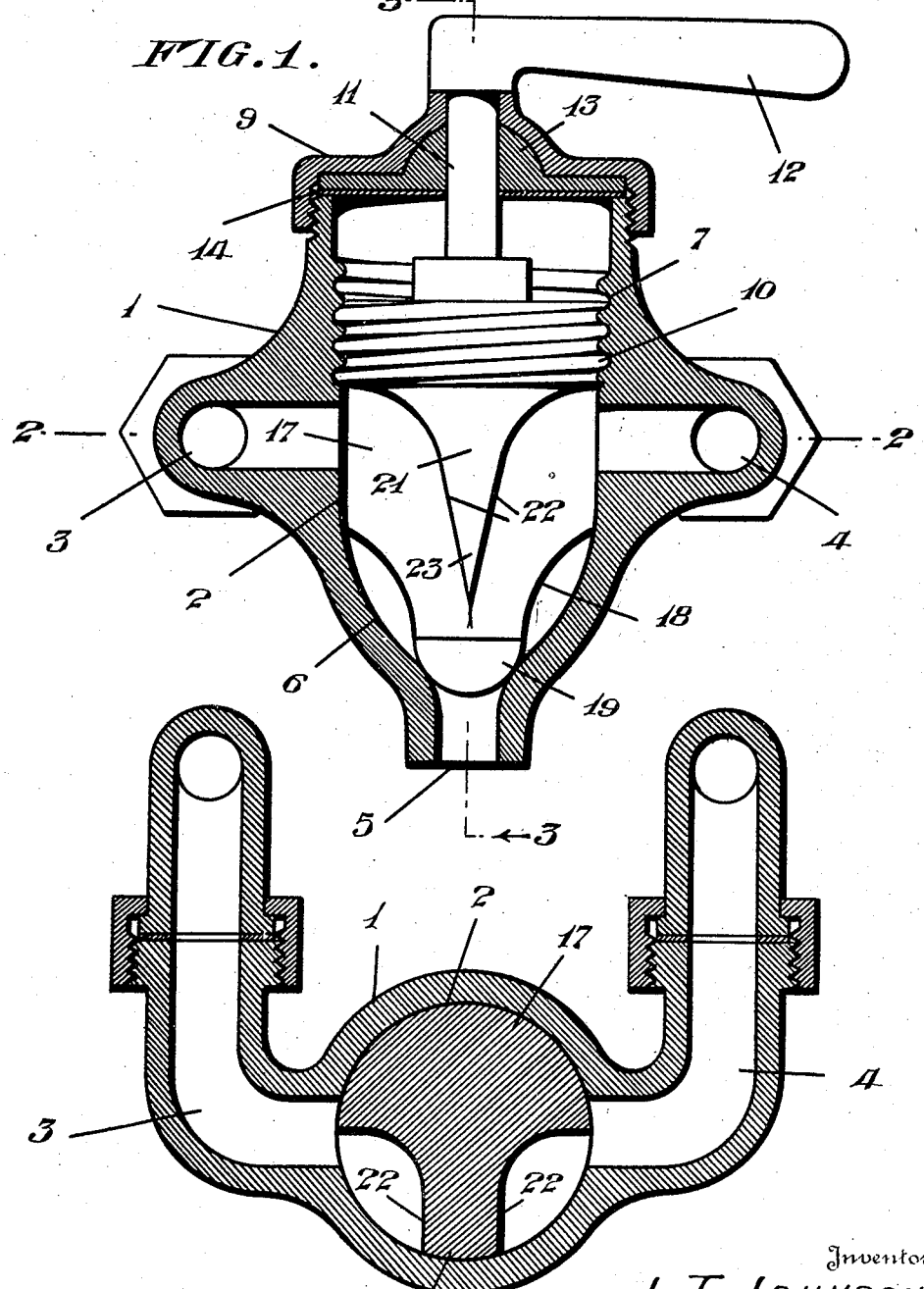

Patented Jan. 1, 1924.

1,479,546

UNITED STATES PATENT OFFICE.

JACOB T. JOHNSON, OF ATLANTA, GEORGIA.

COMBINATION FAUCET.

Application filed January 4, 1922. Serial No. 526,942.

*To all whom it may concern:*

Be it known that I, JACOB T. JOHNSON, a citizen of the United States, residing at Atlanta, in the county of Fulton and State of Georgia, have invented certain new and useful Improvements in Combination Faucets, of which the following is a specification, reference being had therein to the accompanying drawing.

The present invention relates generally to valves and faucets, and is particularly an improvement of the combination faucet disclosed in my Patent No. 1,336,236, granted April 6, 1920.

It is an object of the invention to provide a combination faucet or valve adapted especially for use for tubs, kitchen sinks, stationary wash stands, wall showers and baths, barber shop fixtures and the like for controlling the flow of hot and cold water or separate streams of liquid by the movement of a single valve member and handle, so that the temperature or mixture of water discharged can be regulated conveniently and quickly, thereby saving time and trouble as compared with the common use of individual hot and cold water valves.

A further object is to provide such a faucet or valve construction having a valve member controlling the flow of hot and cold water and so formed that the streams of water are not permitted to meet or mingle together until they are directed in the same general direction to the discharge outlet, in order to prevent the head-on collision of the opposite streams, which, if it occurs causes the jarring or vibration of the plumbing, a loud objectional noise, and the spray of the discharging water.

A still further object is to so construct the valve member of a combination one-handle faucet that the hot and cold water may not only be regulated for drawing hot, medium or cold water, but that the water will also be compelled to flow gently from the discharge outlet, to avoid objectionable splashing or spraying of the discharged water, such as when drawing a cup or other receptacle of water.

The invention also has for its object the provision of a device of the kind indicated which can be manufactured and sold at the lowest possible cost, which is simple and compact in construction, which is durable and efficient, and which can be packed and transported in small space.

With the foregoing and other objects in view, which will be understood as the description proceeds, the invention resides in the construction and arrangement of parts, as hereinafter described and claimed, it being understood that changes can be made within the scope of what is claimed, without departing from the spirit of the invention.

The invention is illustrated in the accompanying drawings, wherein—

Figure 1 is a vertical section of the valve casing, showing the valve member in elevation.

Fig. 2 is a horizontal section on the line 2—2 of Fig. 1.

Fig. 3 is a vertical section on the line 3—3 of Fig. 1 showing the valve member in elevation.

Fig. 4 is a side elevation of a modified form of valve member.

Figs. 5, 6, 7 and 8 are horizontal sections of valve members showing variations in the forms thereof.

The body or casing 1 is of suitable metal and has a vertical chamber 2 and hot and cold water inlet passages 3 and 4, respectively, leading to the opposite sides of a smooth cylindrical wall of the chamber 2, said casing having suitable means for the connection of hot and cold water supply pipes. The lower end of the casing 1 terminates in a discharge nipple or nozzle 5, and the lower end of the chamber 2 is gradually reduced in diameter or tapered as at 6, so that the wall of the chamber converges and merges into the nozzle or outlet portion 5 to provide a valve seat at the upper end of said nozzle. The chamber 2 is internally screw-threaded, as at 7, at a point above the passages 3 and 4, and the upper end of the chamber 2 is closed by a cap 9 threaded onto the upper end of the casing.

The valve member 10 is externally screw-threaded to engage the screw-threads 7, and has an upstanding stem 11 projecting through the cap 9 and having attached thereto a suitable handle 12 for rotating the valve member, it being noted that when the valve member is turned it will move longitudinally within the chamber 2 as well as being rotated.

It is preferable to provide a rubber or other suitable gasket or washer 13, or packing, around the stem 11 to bear and fit against the cap 9 on the interior, so as to prevent leakage of water through the upper portion of the casing. Said washer or packing is retained in place by a metal disk or washer 14 seated on the upper end of the casing, although any necessary or suitable packing can be used.

The valve member 10 is provided with means for controlling the flow of water from the passages 3 and 4 into the chamber 2, and, for this purpose, said member 10 is provided with a depending valve portion 17 of semi-circular cross section, having its cylindrical surface fitting snugly against the smooth cylindrical wall of the chamber 2 and movable across the inner ends of passages 3 and 4. Thus, when the valve member is turned, said portion 17 may be moved to close either of the passages, or may be moved to intermediate position, as seen in Fig. 2, for the flow of both hot and cold water, and by turning the valve member slightly either way, the flow of hot and cold water can be regulated nicely and quickly. The portion 17 thus controls the discharge of hot and cold water from the passages 3 and 4 into the chamber 2, and in order to control the discharge of water from said chamber through the nozzle 5, the valve member is provided with a depending finger or reduced portion 18 extending from the lower end of the valve portion 17. The finger or stud 18 is tapered or reduced in diameter, so as to be spaced from the wall of the chamber, for the flow of water around said finger or stud, and a valve tip or head 19 of rubber, fibre or similar material is secured to the end of the finger or stud 18, by means of a screw 20, or the like, to bear on the lower end portion or seat of the casing over the discharge outlet, with a compression fit. This valve tip 19 closes the discharge port of the valve when the valve member is screwed down tight, and the valve thus shuts off the flow of water when the valve member is screwed down, providing an effective cut off for both hot and cold water. The flow is established by screwing the valve member upwardly, so as to raise the valve tip 19 off of its seat. The valve member can then be turned to control the flow of hot and cold water, and the portion 17 regulates the flow of hot and cold water, while the valve tip or head 19 cuts off the flow of water from the casing when the valve member is screwed down tight, to avoid any escape of water through the outlet.

As a means for preventing the inflowing streams of hot and cold water from having a head-on collision within the chamber 2, and to direct the streams of water downwardly toward the outlet prior to being mixed, the valve member is provided with a radial partition or baffle 21 united with the flat inner side of the portion 17 and lower surface of the valve member 10 proper. The outer edge of the baffle 21 fits snugly against the smooth cylindrical wall of the chamber, and said baffle tapers or decreases in width from its upper to its lower end, the opposite sides 22 of the baffle converging downwardly in opposite inclined positions, and the lower end of the baffle terminating in a point or sharp edge which merges into the finger or stud 18. The lower end portion of the baffle or partition 21 can be cut away, as at 23, to correspond to the tapering or reducing of the finger or stud 18. The hot and cold water in flowing into the chamber 2 from the passages 3 and 4, even under high pressure, will strike the partition or baffle 21, thereby preventing such streams from striking one another from opposite directions, and thereby eliminating objectionable noise or vibration of the fixture and plumbing. The baffle not only prevents such head-on collision of the opposing streams of water, but also serves as a deflector for deflecting the streams of water downwardly toward the discharge outlet, and such streams only meet and mingle after passing the lower end of the baffle on their way to the outlet. The mixing of the hot and cold water is thus delayed until the streams are deflected or directed toward the outlet, so as to minimize the disturbance within the casing resulting from the discharging streams of water under pressure and the commingling thereof. The streams of water being deflected by the baffle toward the outlet, will also reduce the agitation or spraying of the water when discharged from the outlet. After the water leaves the baffle, it can pass around the valve tip 19 on all sides to flow through the outlet.

By the use of the partition or baffle 21, several advantages are obtained, namely, (1) the mixing of the hot and cold water after they have been directed to flow in the same general direction toward the outlet, (2) the prevention of a head-on collision of the hot and cold water, (3) the minimizing of the spraying and agitation of the discharging water, (4) the elimination of objectionable noise and vibration of the fixture and plumbing, and (5) the reduction in the flow of either hot or cold water when the baffle or partition 21 is moved partially across the end of the corresponding water passage, so that the water can be drawn in a reduced stream without splashing from the glass or vessel.

In the modified form shown in Fig. 4, the partition or baffle 21' is of uniform thickness from its upper to its lower end, and Figs. 5, 6, 7 and 8 show the opposite sides of the baffles or partitions formed in different ways that may be desirable or advantageous under different conditions.

Having thus described the invention, what is claimed as new is:—

1. A valve comprising a casing having a chamber with an outlet at one end and inlet passages leading to the wall of said chamber, and a valve member rotatable in said chamber having an arcuate portion fitting the wall of the chamber and controlling the flow from said passages into the chamber, said valve member having a baffle opposite to said arcuate portion fitting snugly against said wall to prevent the head-on collision of the streams entering said chamber from said passages and for directing said streams toward the outlet before they meet.

2. A valve comprising a casing having a chamber with an outlet at one end and inlet passages leading to the wall of said chamber, and a valve member rotatable in said chamber having an arcuate portion fitting the wall of the chamber and controlling the flow from said passages into the chamber, said valve member having a baffle opposite to said arcuate portion fitting snugly against said wall to prevent the head-on collision of the streams entering said chamber from said passages, said baffle being tapered toward said outlet and having sides converging toward said outlet for directing the streams along converging lines toward the outlet before they meet beyond the end of the baffle.

3. A valve comprising a casing having a chamber with an outlet at one end of the chamber and inlet passages leading to the wall of said chamber, said chamber wall having a smooth cylindrical surface, and a valve member screw-threaded within said chamber and having a tip at one end to seat over said outlet, said valve member having an arcuate portion fitting said cylindrical surface to control the flow from said passages into said chamber, the valve member having a baffle opposite to said arcuate portion fitting snugly against said surface to prevent the head-on collision of the streams flowing from said passages into said chamber, said baffle projecting toward said tip for directing the streams toward said outlet before they meet beyond the end of the baffle.

4. A valve comprising a casing having a chamber with a smooth cylindrical surface, an outlet at one end of said chamber, inlet passages leading to said surface of the wall of the chamber, and screw-threads in said wall at that side of said passages opposite to the outlet, and a valve member having a screw-threaded portion engaging said screw threads and an arcuate portion projecting from said portion and fitting said cylindrical surface to control the flow from said passages into said chamber, the valve member having a tip seatable over said outlet, and the valve member having a baffle opposite to said arcuate portion snugly fitting said cylindrical surface to prevent the head-on collision of the streams entering said chamber from said passages, said baffle projecting from the first named portion of the valve member toward the outlet and being tapered with sides converging toward the outlet to direct the streams along converging lines to meet beyond the end of the baffle at said tip.

In testimony whereof I hereunto affix my signature.

JACOB T. JOHNSON.